(12) United States Patent
Albrecht et al.

(10) Patent No.: US 8,850,952 B2
(45) Date of Patent: Oct. 7, 2014

(54) CYLINDER PHASER VALVES

(76) Inventors: David E. Albrecht, Blue Bell, PA (US);
David E. Albrecht, Jr., Schwenksville, PA (US)

( * ) Notice: Subject to any disclaimer, the term of this patent is extended or adjusted under 35 U.S.C. 154(b) by 960 days.

(21) Appl. No.: 12/996,771

(22) PCT Filed: Feb. 22, 2010

(86) PCT No.: PCT/US2010/024858
§ 371 (c)(1),
(2), (4) Date: Dec. 7, 2010

(87) PCT Pub. No.: WO2010/096737
PCT Pub. Date: Aug. 26, 2010

(65) Prior Publication Data
US 2011/0079142 A1    Apr. 7, 2011

Related U.S. Application Data

(60) Provisional application No. 61/154,523, filed on Feb. 23, 2009.

(51) Int. Cl.
*F15B 15/14* (2006.01)
*F15B 15/20* (2006.01)
*F15B 11/22* (2006.01)
*F16K 15/18* (2006.01)

(52) U.S. Cl.
CPC ............. *F16K 15/18* (2013.01); *F15B 15/204* (2013.01); *F15B 11/22* (2013.01)

USPC .................................. 91/401; 91/228; 91/229

(58) Field of Classification Search
USPC ........... 91/247, 249, 399–401, 224, 228, 229, 91/171, 189 A; 137/516.25; 111/247, 249, 111/399–401, 224, 228, 229, 171, 189 A
See application file for complete search history.

(56) References Cited

U.S. PATENT DOCUMENTS 7,739,941 B2 *   6/2010   Noble et al. ................. 91/363 R
8,397,748 B2 *   3/2013   Bram et al. .................... 137/494

OTHER PUBLICATIONS

IPR for PCT/US2010/024858, Apr. 23, 2010.

\* cited by examiner

*Primary Examiner* — Ned Landrum
*Assistant Examiner* — Logan Kraft
(74) *Attorney, Agent, or Firm* — Muskin & Farmer LLC

(57) ABSTRACT

A phaser valve for a piston and cylinder assembly helps to keep a pair of pistons in phase with each other. The phaser valve includes a poppet which is slidable between opposing seats of a valve housing. The poppet includes a head and a stem, both the head and the stem having concave portions which facilitate the flow of hydraulic fluid across the valve. The poppet head has two generally conical ends, so that the head makes a fluid-tight seal with a seat when the head is urged towards either seat. Due to its construction, the phaser valve may be built to fit within a very small space, while still allowing a substantial flow of fluid when the head is not in abutment with one of the seats.

22 Claims, 30 Drawing Sheets

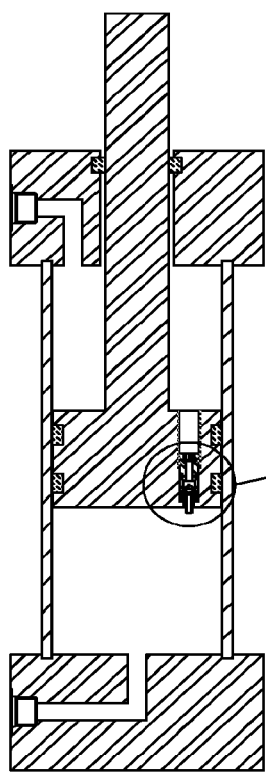 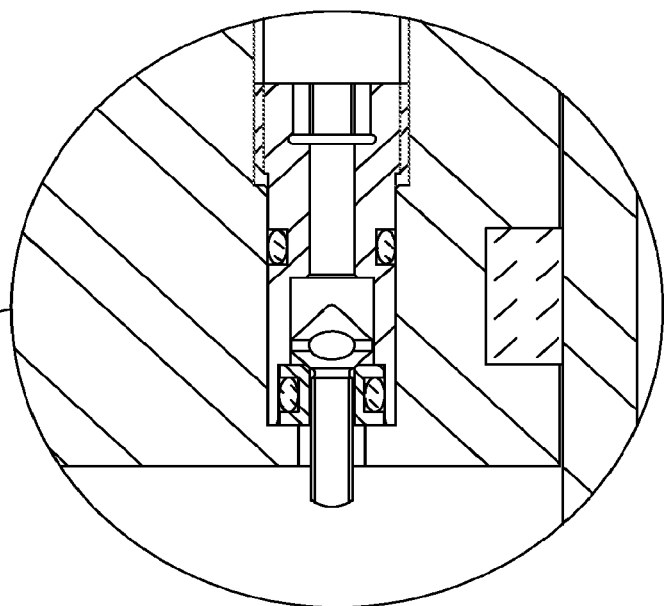
FIG. 11a  FIG. 11b

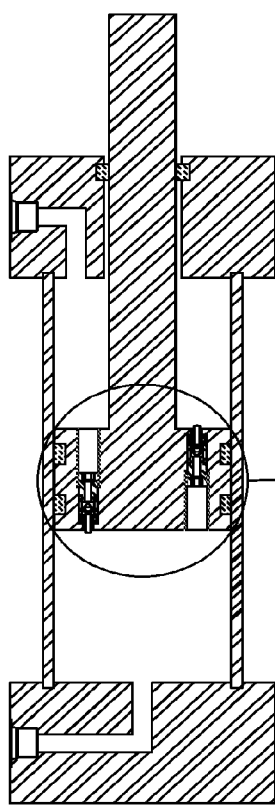 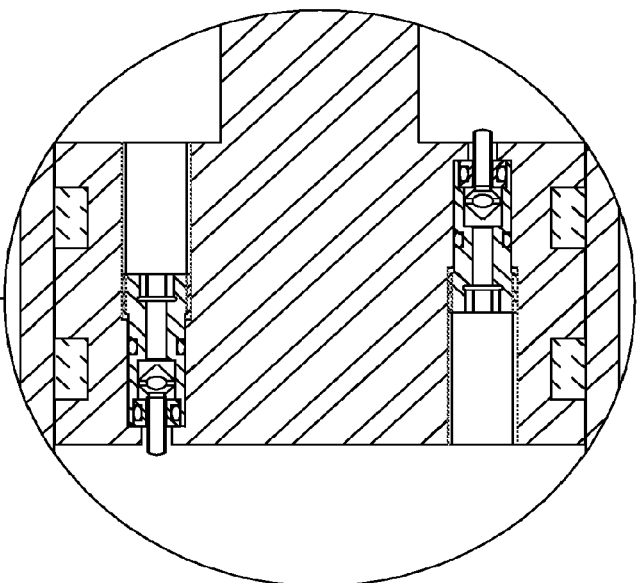
FIG. 12a    FIG. 12b

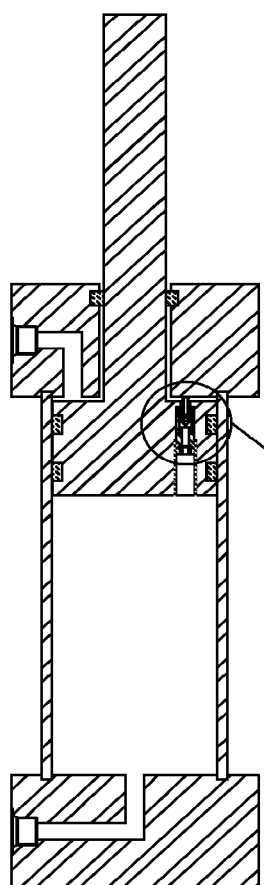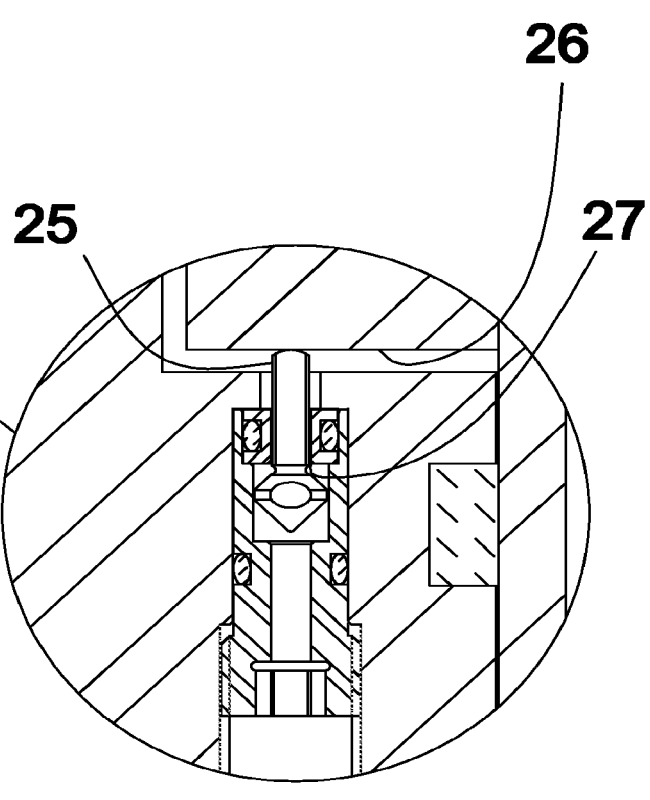
FIG. 15a  FIG. 15b

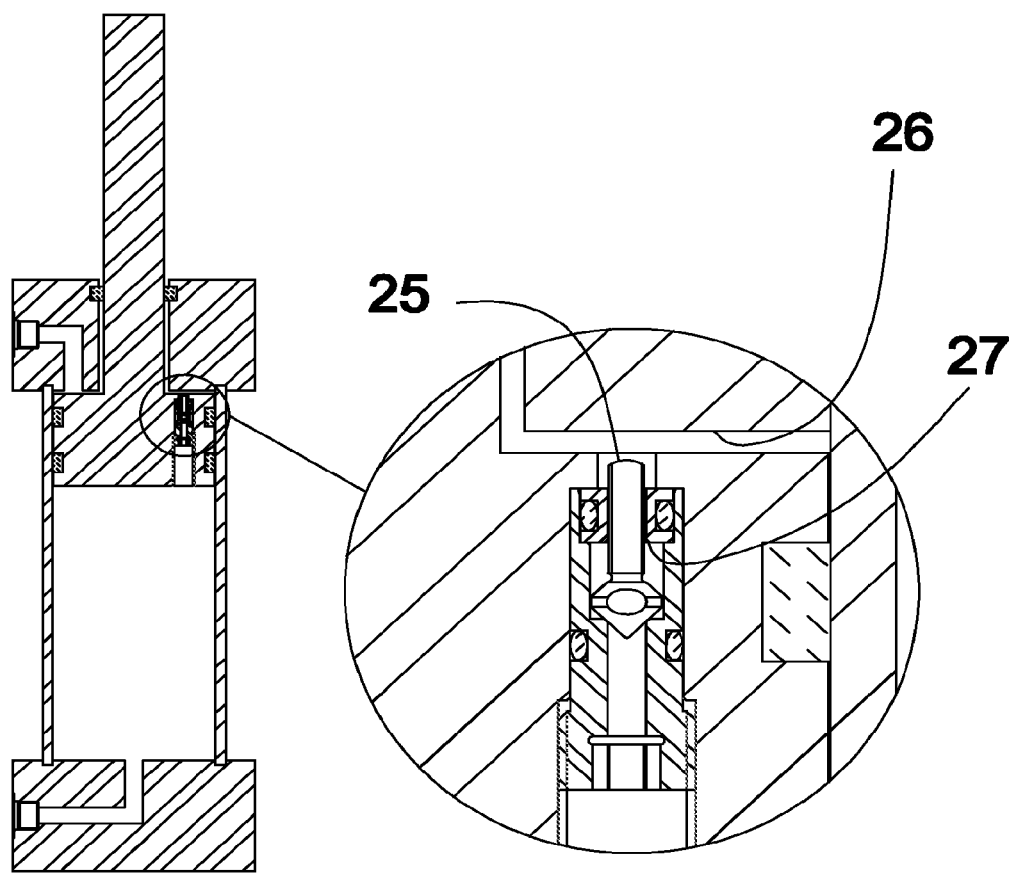
FIG. 16a FIG. 16b

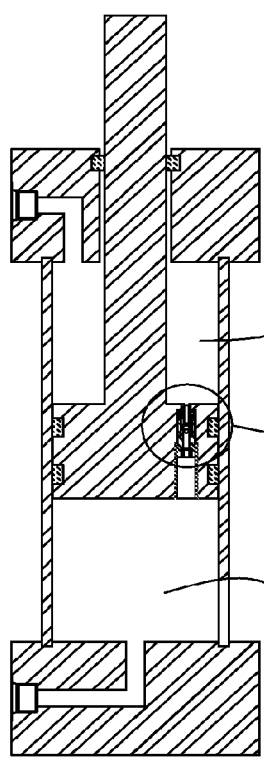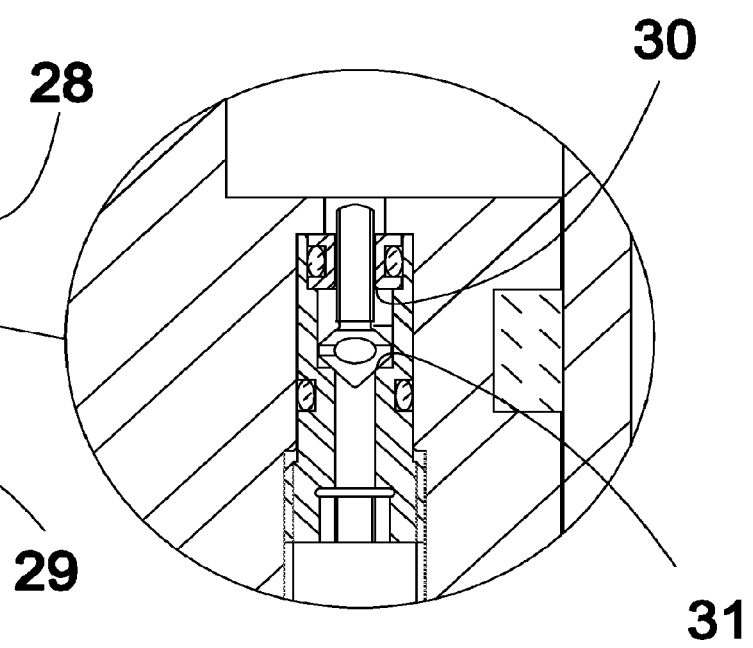
FIG. 17a  FIG. 17b

FIG. 21a  FIG. 21b

CYLINDER PHASER VALVES

CROSS-REFERENCE TO PRIOR APPLICATION

This Application is a 35 USC 371 national stage filing of international application No. PCT/US2010/24858, filed Feb. 22, 2010, which claims priority to U.S. provisional application 61/154,523, filed on Feb. 23, 2009 in the USPTO. All of these applications are incorporated by reference in their entireties.

BACKGROUND OF THE INVENTION

The present invention relates to hydraulic cylinders which are used to operate heavy equipment, such as lifts, cranes, and the like.

In particular, the invention comprises a novel valve having a geometry designed to synchronize the position of two or more hydraulic cylinders operating together at the end of either or both of their directions of stroke.

More particularly, the invention provides an improved valve structure which enables the above-described valve to accomplish its objective, and wherein the valve occupies a very small space.

If two cylinders are operating in parallel, differences in leakage across piston seals, differences in cylinder or rod diameters, or other reasons, can cause differences in cylinder position to accrue over time. The rods and ends of these parallel cylinders are often fixed to the same structures. Should the cylinders become "out of phase" with respect to one another (with one cylinder fully extending or fully retracting before the other), undesirable deformation stresses such as twisting can result if the cylinders are driving the same structure.

An example of the use of parallel hydraulic cylinders, in which the cylinders are attached to the same structure, is a device in which the cylinders are attached to the main boom of a crane.

An example of two cylinders working in parallel, but attached to different structures, is outrigger cylinders. Hydraulic outriggers are often provided on mobile lifts, cranes, and construction equipment to stabilize the vehicle on which the lift, crane, or construction tool (shovel or bucket) is mounted.

Outriggers generally serve two purposes. The first is to eliminate the vehicle suspension, and possibly pneumatic tires, in the support of the crane. Outriggers will generally lift the vehicle tires off of the ground such that the vehicle has a rigid support. It is undesirable for a crane platform or the like to move or bounce.

The second purpose is to widen the vehicle's contact with the ground so that it becomes more difficult to extend the center of gravity of the vehicle over the most lateral contact point with the ground. Such extension of the center of gravity will result in tipping of the vehicle. Using a crane as an example, the wider the contact with the ground, the larger the "load envelope" within which the fully loaded crane can safely operate.

Should outrigger cylinders become out of phase due to accrual of differences in piston leakage, one outrigger will strike the ground before the other, and the result will be tilting of the vehicle, a condition that the outriggers are provided to prevent.

The present invention provides a solution for the problems described above, by providing an improved phaser valve which assists in synchronizing two or more cylinders.

SUMMARY OF THE INVENTION

The cylinder phaser valves of this invention are to be installed in the pistons of cylinders that are working together.

Normally, the blind end and the rod end of a cylinder are prevented from fluid communication by seals around the periphery of the piston. Pressurized fluid introduced into either the blind end or the rod end of the cylinder will then cause translational movement of the piston within the cylinder bore. The cylinder may then perform useful work.

Differential pressure across the piston is responsible for movement of the rod of the cylinder. Any communication between the blind and rod ends will tend to lessen or eliminate this pressure differential.

The valve of the present invention is configured in such a manner that as the piston of the cylinder approaches one end of its travel, the valve is opened to allow communication between the blind end and the rod end. Therefore, while the valve is opened, translational motion of the piston within the cylinder bore is stopped or slowed, as oil is discharged from the pressurized end of the cylinder, across the piston, and out of the depressurized end of the cylinder.

Thus, when one cylinder reaches the end of its stroke, the cylinder phaser valve in its piston is opened, and another cylinder or cylinders operating in parallel is (are) allowed to synchronize its (their) position(s), or "catch up" with the first cylinder.

The cylinder phaser valve of the present invention is therefore effective only during a limited portion of the operating cycle of the piston and cylinder assembly. That is, the phaser valve of the present invention does not allow communication of the rod end of the cylinder with the blind end under most circumstances, but allows such communication only when a piston is approaching one end of its path of travel.

The valve of the present invention includes a poppet head and stem which slide axially within a cartridge. Both the poppet head and stem have concave surfaces which allow fluid to flow around them (when the poppet head is not forming a seal against the seat defined by the cartridge body or the seat defined by a stem guide). This structure enables the valve to be constructed in a small size, while still allowing sufficient fluid to flow through when desired.

The phaser valve also functions as a cushion valve, slowing the speed of travel of the piston rod at the end of its stroke, and thereby minimizing the impact of the piston on the end of the cylinder bore. The latter results in less vibration and noise, and is likely to increase the lifespan of the cylinder assembly.

The present invention therefore has the primary object of providing a valve which enables the synchronization of two or more cylinder assemblies.

The invention has the further object of minimizing the size of the valve described above, while still permitting a desired flow of fluid when the valve is opened.

The invention has the further object of reducing the size of a phaser valve used in synchronizing two or more cylinders.

The invention has the further object of reducing vibration and noise in a cylinder assembly.

The invention has the further object of prolonging the useful life of a cylinder assembly.

Other objects and advantages of the present invention will be apparent to those skilled in the art, from a reading of the following brief description of the drawings, the detailed description of the invention, and the appended claims.

BRIEF DESCRIPTION OF THE DRAWINGS

FIG. 7b provides an end view of the valve stem guide of FIG. 7a.

FIG. 8b provides an end view of the cartridge body of FIG. 8a.

FIG. 11a provides a cross-sectional view of a hydraulic cylinder assembly with the present invention incorporated into the piston.

FIG. 11b provides an expanded cross-sectional view of a portion of FIG. 11a, in which the device of the present invention is oriented so that it is actuated when the piston rod approaches full retraction.

FIG. 12a provides a cross-sectional view of a hydraulic cylinder assembly having two valves, made according to the present invention, incorporated within the piston of the cylinder assembly.

FIG. 12b provides an expanded cross-sectional view of a portion of FIG. 12a, showing the valves of the present invention within the piston of the cylinder assembly, each valve being oriented in opposite directions such that one will be actuated when the piston rod approaches full extension, while the other is actuated when the piston rod approaches full retraction.

FIG. 15a provides a cross-sectional view of a hydraulic cylinder assembly having the device of the present invention incorporated within the piston of the cylinder assembly.

FIG. 15b provides an expanded cross-sectional view of a portion of FIG. 15a, showing the device of the present invention in the piston of the cylinder assembly, the stem of the poppet being in contact with the end of the cylinder as the rod approaches maximum extension, and the poppet being therefore no longer in sealing contact with the valve stem guide, despite pressure being applied to the blind end.

FIG. 16a provides a cross-sectional view of a hydraulic cylinder assembly having the device of the present invention incorporated within the piston of the cylinder assembly, the poppet head being urged to a position in sealing contact with the cartridge.

FIG. 16b provides an expanded cross-sectional view of a portion of FIG. 16a, with the device of the present invention in the piston of the cylinder assembly.

FIG. 17a provides a cross-sectional view of a hydraulic cylinder assembly having the device of the present invention incorporated within the piston of the cylinder assembly, wherein the poppet head is urged to a position in sealing contact with the cartridge.

FIG. 17b provides an expanded cross-sectional view of a portion of FIG. 17a, with the device of the present invention in the piston of the cylinder.

DETAILED DESCRIPTION OF THE INVENTION

The phaser valve of the present invention comprises an assembly having three main parts (exclusive of seals):
1. Poppet/stem
2. Valve Stem Guide
3. Cartridge Body Housing The poppet includes a poppet head 100 and a stem portion 3 (see, for example, FIG. 1b).

Figure 5A:
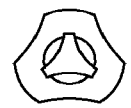
FIGS. 5a-5c provide an elevational view (FIG. 5b) and two end views (FIGS. 5a and 5c), taken from mutually opposite directions, of the poppet head and stem structure used in the present invention.
Figure 5B:
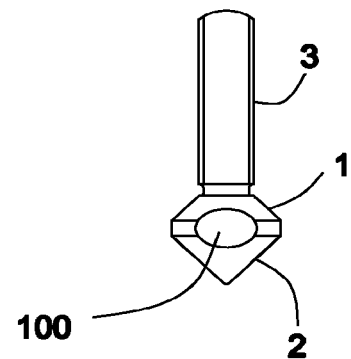
Figure 5C:
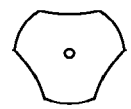

As shown in FIGS. 5a-5c, the poppet head 100 comprises two conical surfaces 1 and 2, oriented 180 degrees apart. One surface 2 seals against a seat (indicated by reference numeral 13 of FIG. 8a) in the cartridge body. The opposite surface 1 seals against a similar sealing surface (indicated by reference numeral 6a of FIG. 7a) in the valve stem guide 4.

The stem 3 of the poppet (FIG. 5b) extends axially from one conical surface. The stem must be sufficiently long such that it extends outside the valve housing, or cartridge, during at least a portion of the travel of the poppet.

Figure 5D:
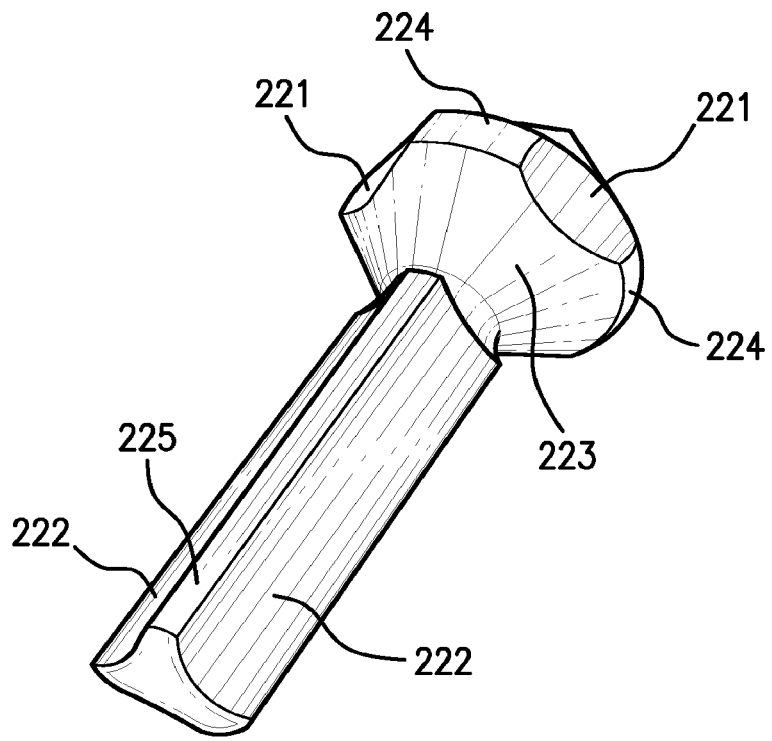
FIGS. 5d and 5e provide perspective views, taken from different directions, of the poppet head and stem of the present invention.
Figure 5E:
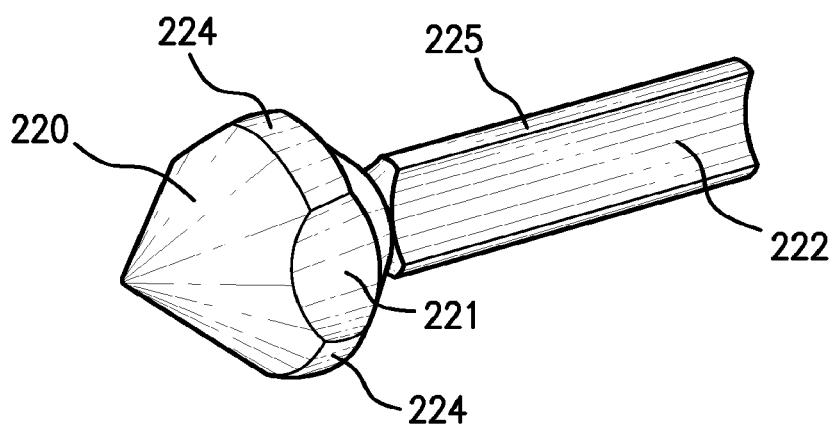

FIGS. 5d and 5e provide perspective views of the poppet head and stem of the present invention. As is best shown in FIG. 5e, the poppet head has a forward or distal portion 220 which is generally conical. The poppet head also has a rearward or proximal portion 223 which is also generally conical. The poppet head includes a plurality of lands 224 which are separated by concave regions 221, the lands and concave regions being located between the forward or distal portion 220 and the rearward or proximal portion 223. The concave regions 221 are generally aligned with elongated concave surfaces 222 of the poppet stem. The concave surfaces 222 extend along substantially the entire length of the stem. The alignment of the concave surfaces 222 with the concave regions 221 facilitates the flow of fluid around the poppet, because such fluid is not required to make any more turns than necessary, thus minimizing the pressure drop. The stem also includes lands 225. The lands of the stem abut, or nearly abut, the interior surface of the valve stem guide (not shown in FIGS. 5d-e).

The poppet head, in cross-section, is thus generally circular, except to the extent that the circle is "gouged" by the concave regions, as is illustrated, for example, in FIGS. 5c-e.

The number of concave regions and surfaces, on the poppet head and the poppet stem, respectively, can be varied, but the preferred number is three such regions and three such surfaces. Thus, in the preferred embodiment, the stem has a generally triangular cross-section.

FIG. 5e shows that the forward portion of the poppet head will make a suitable fluid seal when it abuts a circular opening comprising the valve seat. As long as the head engages the seat at a position which is forward relative to the concave region, the conical head will fully engage the opening, and no leakage of fluid will occur. Similarly, FIG. 5d shows that the rearward portion of the poppet head will make a seal when it abuts the opposing valve seat.

Figure 7A:
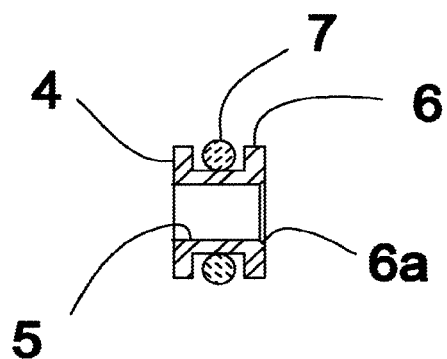
FIG. 7a provides a cross-sectional view of the valve stem guide used in the present invention.
Figure 7B:
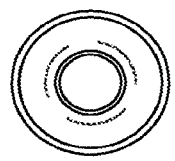

As shown in FIGS. 7a-b, the valve stem guide 4 has a central bore 5 through which the stem extends. The stem is thus guided within a generally cylindrical channel defined by the stem guide. The valve stem guide has an outer diameter such that it may be assembled within the cartridge body. A seal 7 is placed peripherally about the valve stem guide to prevent leakage of fluid between the valve stem guide and the cartridge.

Figure 8A:
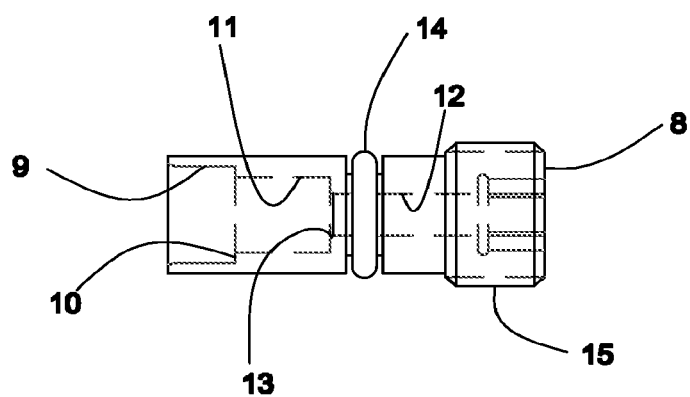
FIG. 8a provides a side elevational view of the cartridge body of the present invention.
Figure 8B:
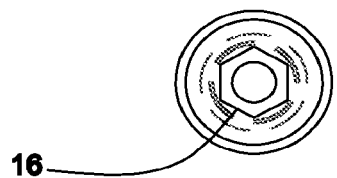

As shown in FIGS. 8a-b, the cartridge body 8 has a stepped central bore of several diameters to accommodate the poppet/stem and the valve stem guide. The valve stem guide is placed within the largest diameter 9 at the end of the cartridge, and abuts against a shoulder 10. A smaller diameter 11 in the central region of the cartridge is designed to contain the poppet. A smaller through bore 12 has a seat 13 immediately adjacent to the central diameter, of a geometry necessary to interface with the poppet (in this case, conical). The cartridge has an outer seal 14 to prevent flow around the cartridge and the bore in the cylinder piston within which it resides. Therefore, the only flow path is through the central bore.

The cartridge body has an external thread 15 that is meant to engage in an internal thread in its corresponding cavity. An internal wrenching surface 16 is provided within the first part of the central bore of the valve. It is recognized that a wide variety of options of wrenching means may be incorporated on the cartridge other than the internal hex shown.

Figure 1A:
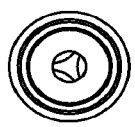
FIGS. 1a-1c provide a cross-sectional view (FIG. 1b) and two end views (FIGS. 1a and 1c) of a cartridge body and valve stem guide, together with a poppet head and stem, as used in the present invention.
Figure 1B:
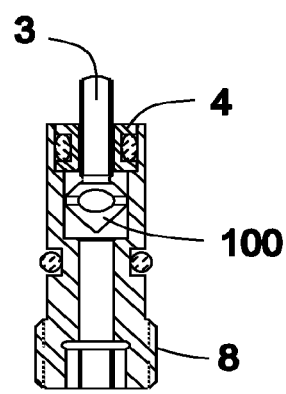
Figure 1C:
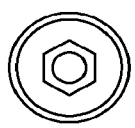
Figure 2:
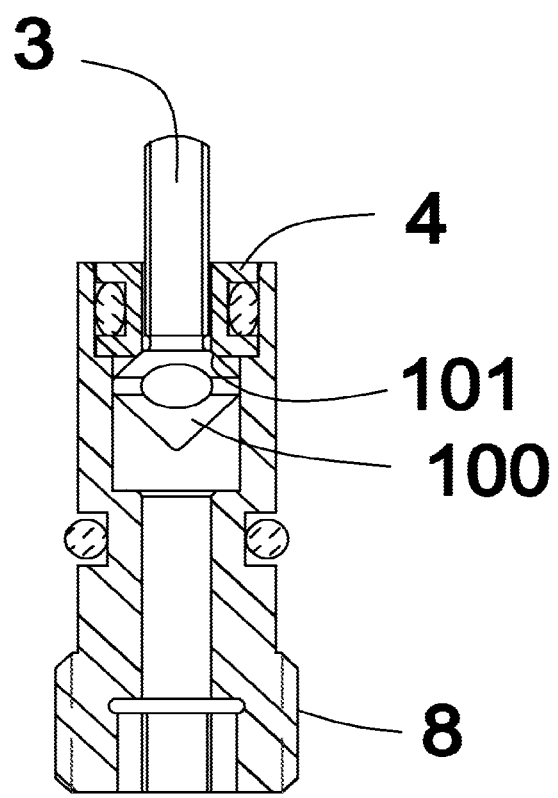
FIG. 2 provides a cross-sectional view of the poppet head and stem in the cartridge body and valve stem guide of the present invention, the poppet head being positioned so that it is in sealing contact with the valve stem guide.
Figure 3:
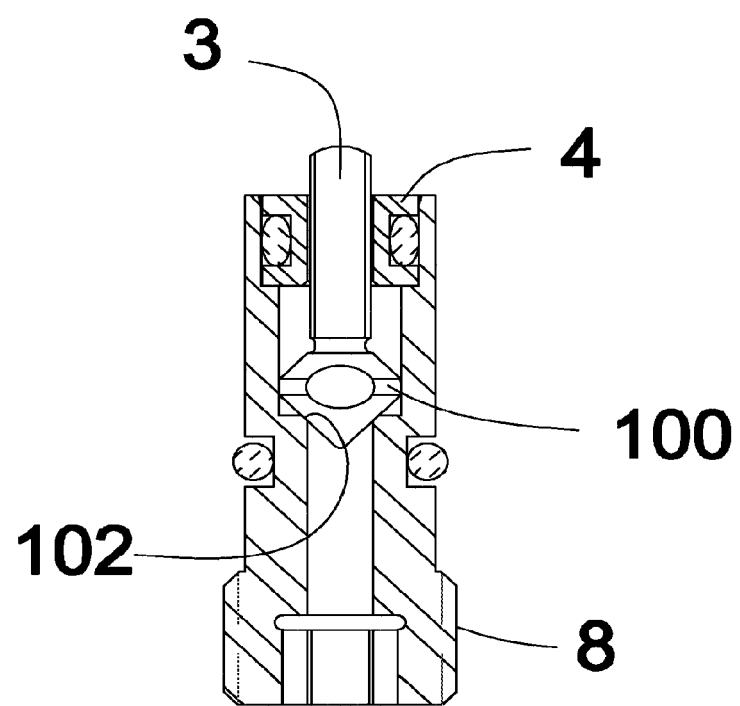
FIG. 3 provides another cross-sectional view of the poppet head and stem in the cartridge body and valve stem guide of the present invention, wherein the poppet head is positioned so that it is in sealing contact with the opposite seat, relative to FIG. 2, of the cartridge body.
Figure 4:
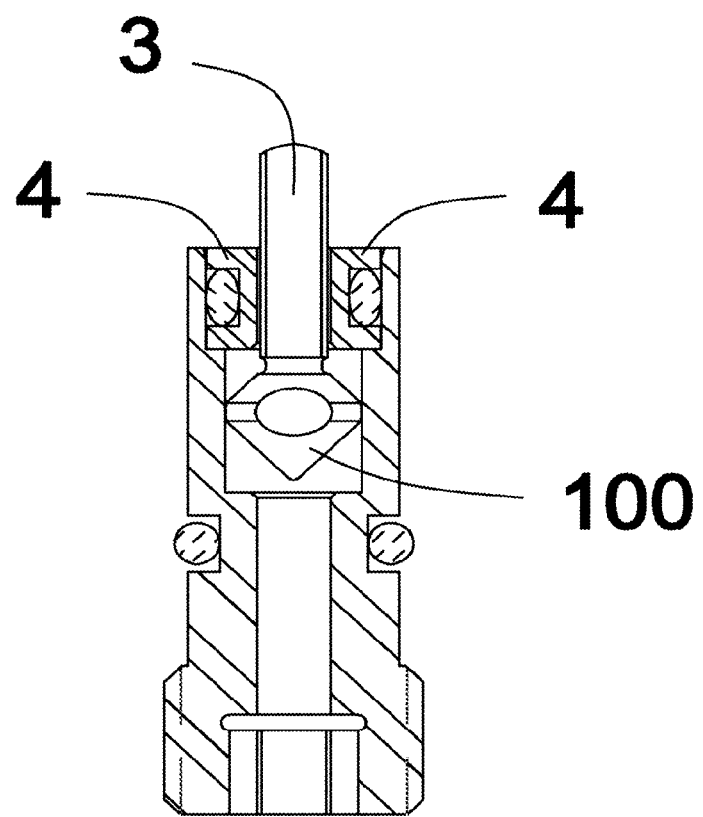
FIG. 4 provides a cross-sectional view similar to that of FIG. 3, in which the poppet head is positioned between the sealing surfaces of the valve stem guide and the cartridge body.

The conical seat 13 of the cartridge body 8 is spaced a distance from the seat of the valve stem guide. This distance is greater than the distance between the opposing sealing surfaces of the poppet. Thus, the poppet may occupy a position at either seat, or somewhere in between. FIG. 2 shows the poppet head 100 at an upper seat 101 of cartridge body 8, while FIG. 3 shows the poppet head 100 at a lower seat 102 of the cartridge body. FIG. 1b and FIG. 4 show the poppet head 100 at an intermediate position. FIGS. 1a and 1c is show opposite end views of the structure of FIG. 1b.

Figure 9:
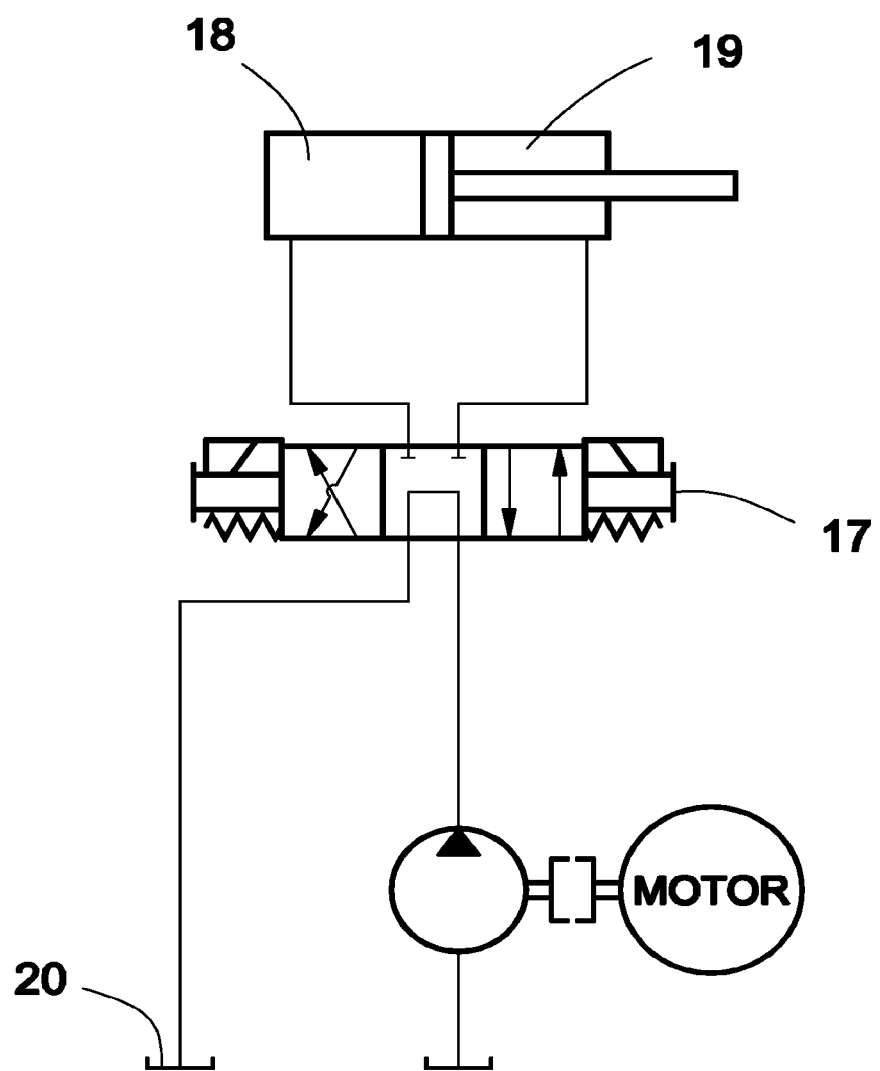
FIG. 9 provides a simple hydraulic schematic diagram of a hydraulic cylinder circuit, as used in the present invention.

FIG. 9 shows a simple hydraulic circuit for controlling the motion of a piston within a cylinder. Through the use of a directional control valve 17, the blind end 18 of the cylinder may be pressurized, while the rod end 19 is vented to a hydraulic reservoir 20 at low pressure. This will cause the piston of the cylinder assembly to extend. Conversely, the rod end may be pressurized, while the blind end is vented to a reservoir. This will cause the piston of the cylinder assembly to retract. The hydraulic circuit of FIG. 9 comprises a means for directing fluid alternately into opposite sides of the piston. The phaser valve of the present invention is essentially a control means which diverts a portion of the hydraulic fluid such that the movement of the piston is slowed, so as to bring the pistons into phase.

Figures 10A, 10B:
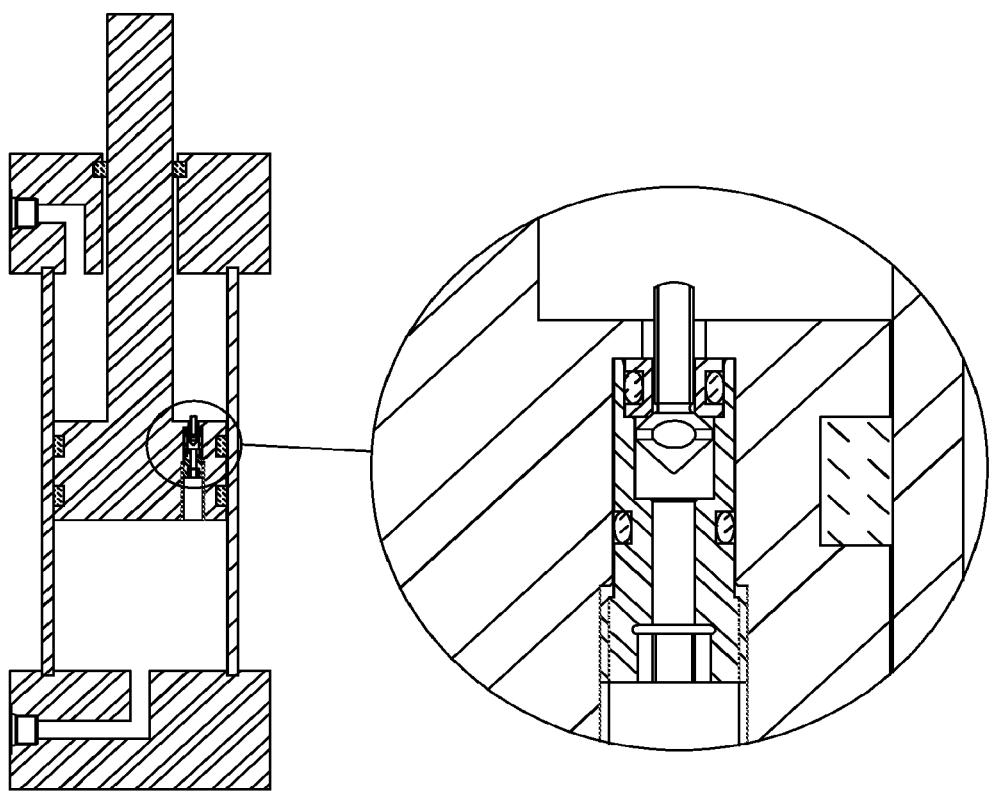
FIG. 10a provides a cross-sectional view of a hydraulic cylinder assembly, showing the present invention incorporated within the piston of such assembly.
FIG. 10b provides an expanded cross-sectional view of a portion of FIG. 10a, showing the present invention as incorporated into the piston of the cylinder assembly, the device of the present invention being oriented so that it is actuated when the piston rod approaches full extension.

FIGS. 10*a-b* show the invention as assembled in the piston of a hydraulic cylinder assembly. It is understood that the orientation of the valve within the piston can be in the other direction to cause the pistons to get back into phase at the opposite extent of travel (as shown in FIGS. 11*a-b*). It is also understood that two valves, oriented in opposite directions, may be utilized to provide synchronization at the termination of each direction of travel (as shown in FIGS. 12*a-b*).

Figures 13A, 13B:
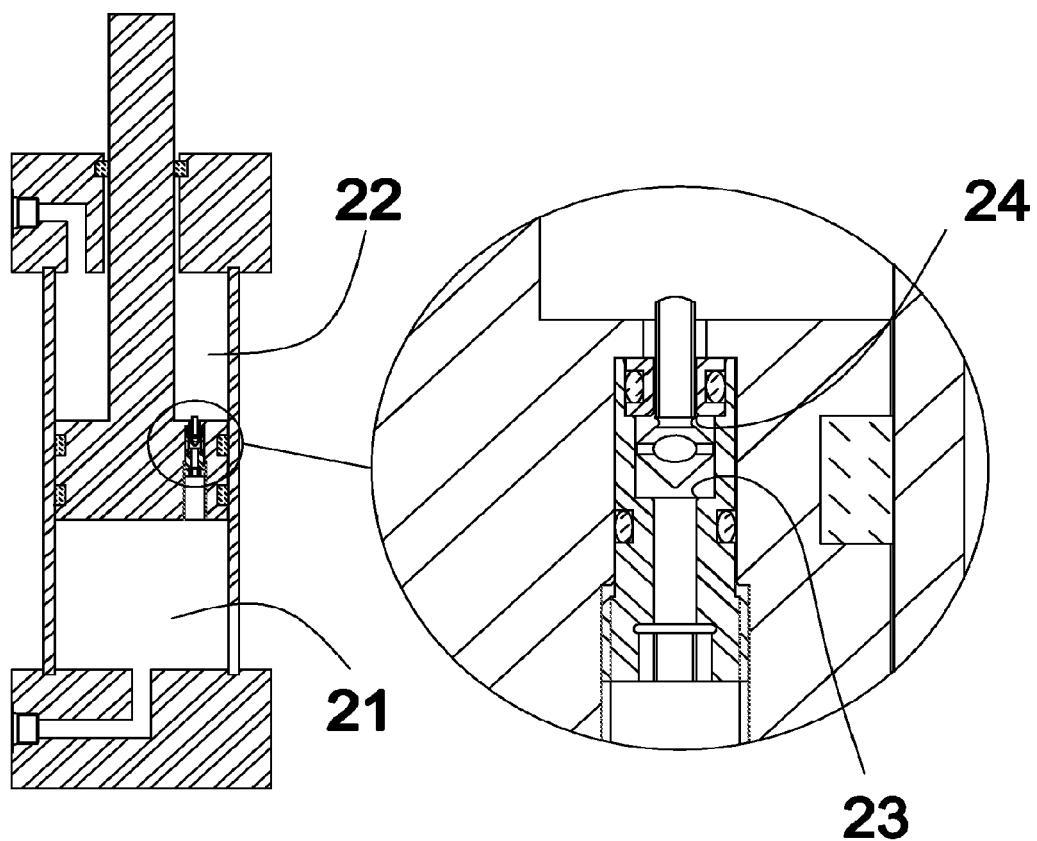
FIG. 13a provides a cross-sectional view of a hydraulic cylinder assembly with a device of the present invention incorporated within the piston of the cylinder assembly, the poppet head being shown at a position between the sealing surfaces of the valve stem guide and cartridge, respectively.
FIG. 13b provides an expanded cross-sectional view of a portion of FIG. 13a, in which the device of the present invention is oriented so that it is actuated when the piston rod approaches full extension.

In FIGS. 13*a-b*, neither the blind end nor the rod end of a hydraulic cylinder is pressurized. As there is no differential pressure across the piston, it will remain stationary. The poppet will not tend to be urged to either seat in the absence of any other force, such as the force of gravity.

Figures 14A, 14B:
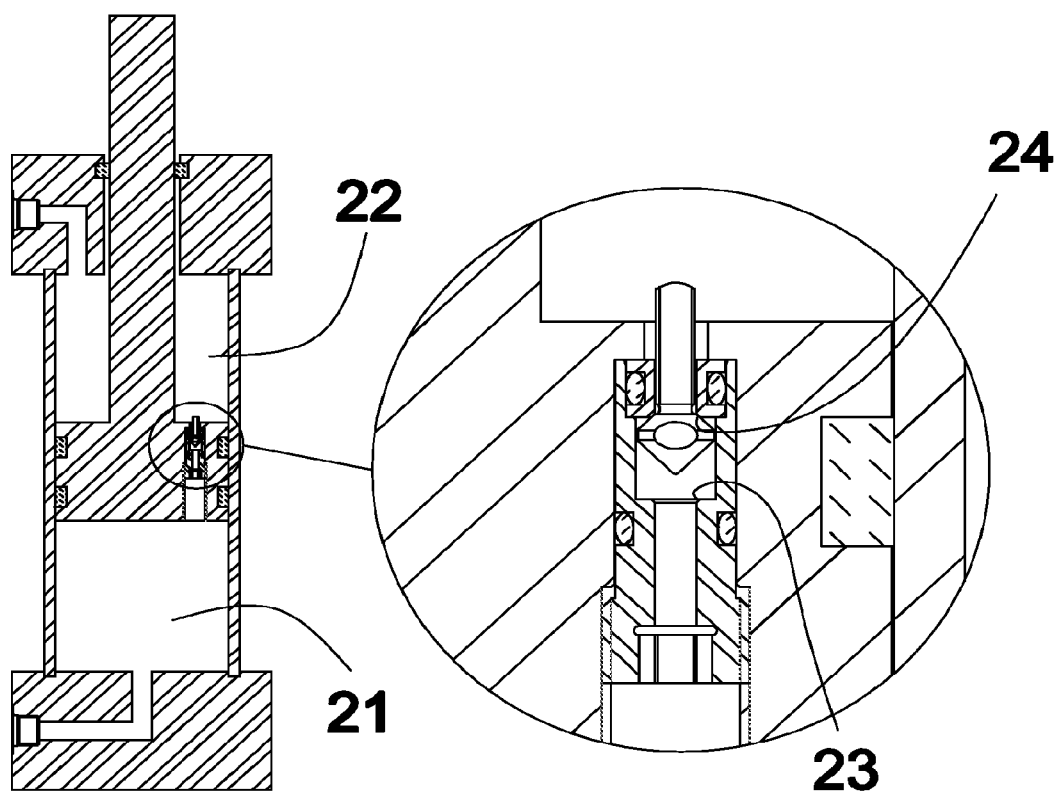
FIG. 14a provides a cross-sectional view of a hydraulic cylinder assembly with the device of the present invention incorporated within the piston of the cylinder assembly, the poppet head being shown urged to a position in sealing contact with the valve stem guide.
FIG. 14b provides an expanded cross-sectional view of a portion of FIG. 14a, the device of the present invention being oriented so that it is actuated when the piston rod approaches full extension.

In FIGS. 14*a-b*, the blind end 21 of a hydraulic cylinder is pressurized. The differential pressure acting on the blind end and rod end piston surfaces will cause the piston to move toward the rod end 22.

This pressure differential will also urge the poppet away from the conical seat on the cartridge body 23 (closest to the blind end) and toward the seat of the valve stem guide 24. The interaction of the tapered seat and the conical surface of the poppet will form a circular metal to metal seal. Therefore, no communication will exist between the blind end and the rod end of the cylinder.

As shown in FIGS. 15*a-b*, when the piston approaches the end of travel at the rod end (full extension), the stem 25 will make contact with the end of the cylinder cavity 26. Any further travel will move the poppet off of its seat 27 on the stem guide, and will allow fluid communication through the piston, from the blind end to the rod end. FIG. 15*b* shows the condition in which the poppet head has just moved off of its seat.

Travel of the piston will then slow or stall.

This will allow a parallel cylinder to continue to extend, at least at a faster rate, and synchronize its position with the first cylinder.

Conversely, should the directional control valve be shifted in the opposite direction, FIGS. 16*a-b* demonstrate movement of the poppet toward the seat on the cartridge.

FIGS. 17*a-b* illustrate the condition wherein pressurized hydraulic fluid is directed to the rod end 28 of the cylinder. Fluid in the blind end 29 of the cylinder will now be directed by the directional control valve to the hydraulic reservoir at low pressure. The piston will be moved towards the blind end.

The poppet of the phaser valve will be urged from the region of high pressure at the conical seat of the valve stem guide 30 (adjacent to the rod end) towards the region of lower pressure at the conical seat of the cartridge body 31. The interface of the poppet head and the seat will again form a seal against the flow of hydraulic fluid, and prevent communication between the rod end and the blind end of the cylinder.

As noted above, the poppet head has two conical surfaces opposed to each other. The included angle of the poppet as shown is 90 degrees. However, this angle can be varied to optimize for flow conditions. A shallower angle will better allow for laminar flow at higher flow rates, other things being equal. A shallower angle has a better tendency for the poppet head and seat to self-align. However, a steeper angle has better opening characteristics, with better gain of flow area for unit travel of the poppet.

Figure 18:
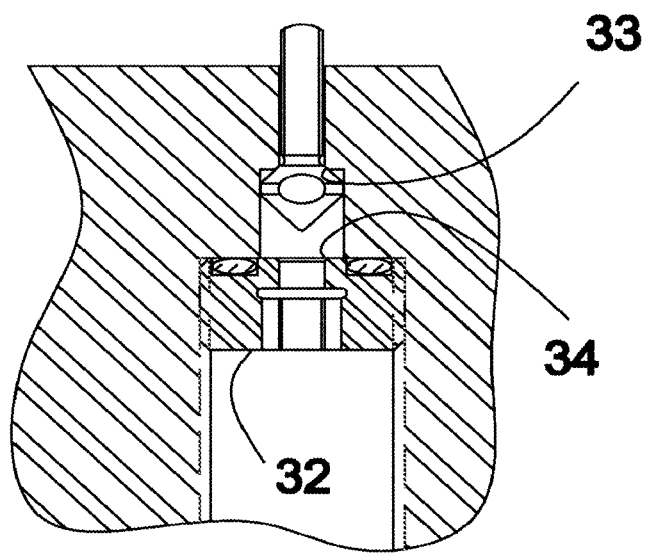
FIG. 18 provides a fragmentary cross-sectional view of a cylinder assembly having the device of the present invention installed, and showing a single-stemmed poppet head and a portion of a poppet retaining member typical of a valve-in-piston design.

Although the invention is described as a cartridge, it is recognized that the same function can be accomplished with a "valve in body" approach, shown in FIG. 18. In such an approach, the working parts of the valve would be placed directly within a specially machined complementary cavity in the cylinder piston. In some circumstances, the "valve in body" approach may be preferred. The cartridge body housing would not be required, and would be replaced by a retaining member 32. This retaining member is not necessarily threaded, but may utilize a flange, snap-ring, or other means to retain the valve parts within the cavity. In this example, one valve seat 33 is machined directly in a cavity within the piston bore, while the other is machined on the retaining member 34.

The invention may be used in a broad range of cylinder sizes. However, the design features make it particularly suited for small cylinders, particularly if a "valve in body" approach is taken. These features allow it to be placed within a smaller envelope than common hydraulic cartridge valves.

Figure 6A:
FIGS. 6a-6c provide an elevational view (FIG. 6b) and two end views (FIGS. 6a and 6c), taken from mutually opposite directions, of a poppet head and double stem structure used in the present invention.
Figure 6B:
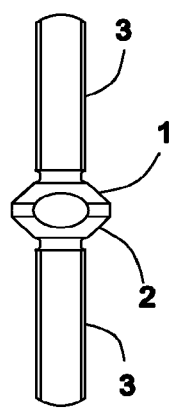
Figure 6C:
Figure 19:
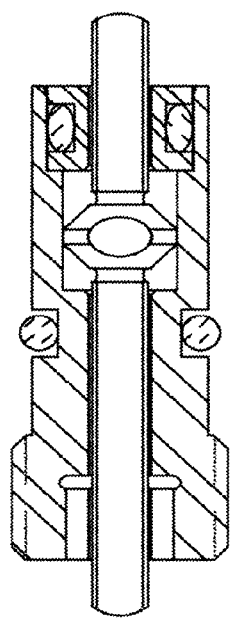
FIG. 19 provides a cross-sectional view of a cartridge and valve stem guide, and showing a double-stemmed poppet within the cartridge, according to the present invention.
Figure 20:
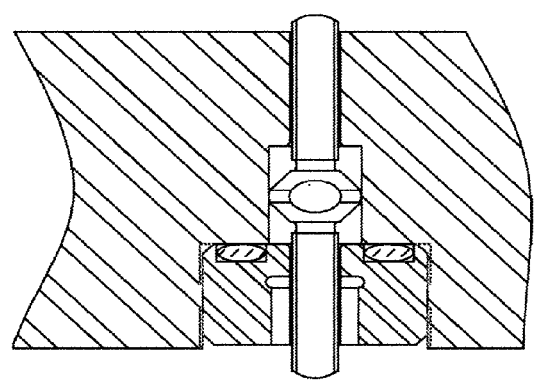
FIG. 20 provides a fragmentary cross-sectional view of a piston within a cylinder assembly, and showing a double-stemmed poppet and a poppet retaining member, according to the present invention.
Figure 21:
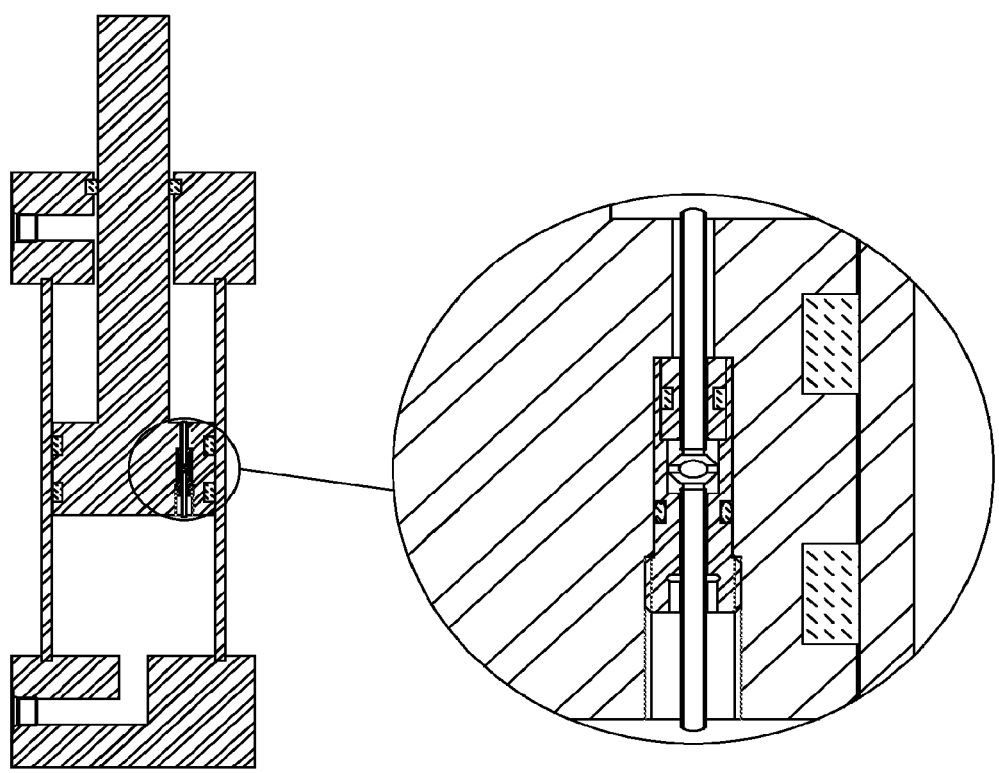
FIG. 21a provides a cross-sectional view of a cylinder assembly, in which there is shown a double-stemmed poppet within a valve assembly, according to the present invention.
FIG. 21b provides an expanded cross-sectional view of a portion of FIG. 21a, showing more clearly a portion of the cross-section of the piston, and the double-stemmed poppet within a cross-section of a valve assembly.

It is understood that the poppet can be made in other geometries, such as spherical. By using the "valve in body" approach, the dimensions of the components can be customized for that particular piston. It is also understood that the poppet can be fashioned with a stem on each surface, as shown in FIGS. 6*a-c*, and the valve configured accordingly, such that there will be phasing at the piston limit in each direction. A poppet so fashioned may be used either with the cartridge design (as shown in FIGS. 19 and 21*a-b*) or with the valve in body design (as shown in FIG. 20). It is understood that a poppet/stem assembly of this configuration must be customized to traverse the thickness of the particular piston in which it is used.

Figure 22:
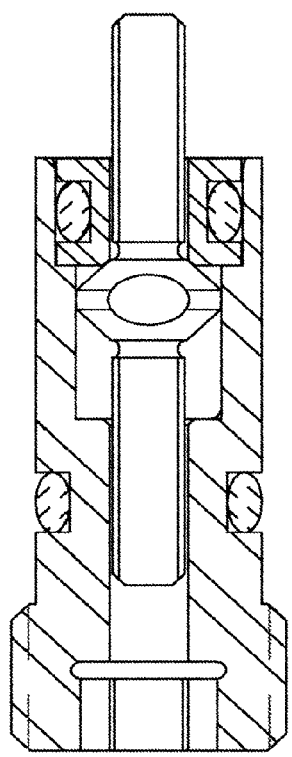
FIG. 22 provides a cross-sectional view of the cartridge of the present invention, showing a variant of the double-stemmed poppet, the poppet being positioned so that it is in sealing contact with the valve stem guide.
Figure 23:
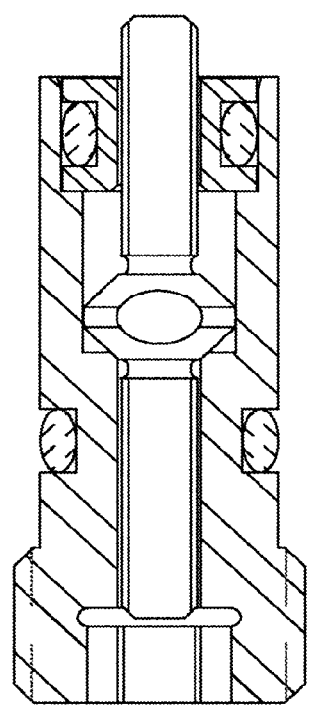
FIG. 23 provides a cross-sectional view of the valve assembly of the present invention, showing a variant of the double-stemmed poppet within the valve assembly, the poppet being positioned so that it is in sealing contact with the cartridge.
Figure 24:
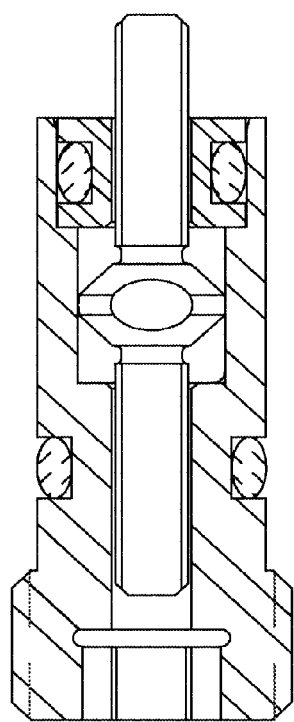
FIG. 24 provides a cross-sectional view of the valve assembly of the present invention, showing a variant of the double-stemmed poppet, the poppet being positioned between the sealing surfaces of the valve stem guide and the cartridge.

The double-stem poppet can be used to provide more axial stability of the poppet, and can be utilized for bidirectional phasing. FIGS. 22-24 show the poppet and stem assembly in a range of positions, from one extreme in sealing contact with the valve stem guide (shown in FIG. 22), to the other extreme in sealing contact with the cartridge (shown in FIG. 23), and in an intermediate position (shown in FIG. 24). In FIG. 23 it is apparent that the second stem never protrudes from the cartridge body, and therefore cannot be used to manually shift the poppet off of the seat. It is used here to provide additional guidance to the poppet for better alignment of the poppet and the seat.

Good alignment is desirable for a poppet with a conical sealing surface, as angular offset of the poppet and seat may result in incomplete contact between the two and leakage. This can be problematic should the end of the cylinder piston strike the poppet in a non-axial manner, due to tolerances in perpendicularity of the cartridge cavity, or tolerances in flatness and/or perpendicularity of the cylinder end. The double stem, by virtue of an increased length of bearing contact, is better suited for wider tolerances in this regard. The use of the double stem also allows for less strict tolerances in the central bore of the stem guide. Thus, the increase in cost of such a poppet may be more than offset by a decrease in manufacturing cost in these other areas. It is recognized that a spherical poppet does not have this angular alignment issue, however this geometry can be more difficult to machine and inspect.

Figure 25:
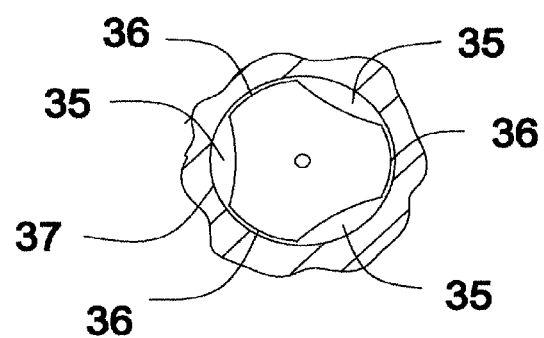
FIG. 25 provides an end view of the poppet within a fragmentary cross-section of a cartridge (or, in a valve-in-body embodiment, a portion of a cross-section of a cavity of a cylinder piston), according to the present invention.

In FIG. 25, the poppet head is shown with three fluid flow channels 35 around its periphery to improve flow, and lessen pressure drop, although a smaller or larger number of fluid channels can be employed. This allows for a smaller overall diameter of the cartridge than if the flow area was provided only by clearance around the poppet's outside diameter. These channels must fall short of the sealing diameter of the poppet and seat interface so as to avoid leaking of the valve in the closed positions. The three raised portions 36 that remain are guide lands that interface with the bore 37 in the cartridge (or piston bore in a valve-in-body design) to guide the poppet axially between opposing seats. Similar flow channels can be fashioned in a poppet of a spherical configuration, with resulting guide lands.

Figure 26:
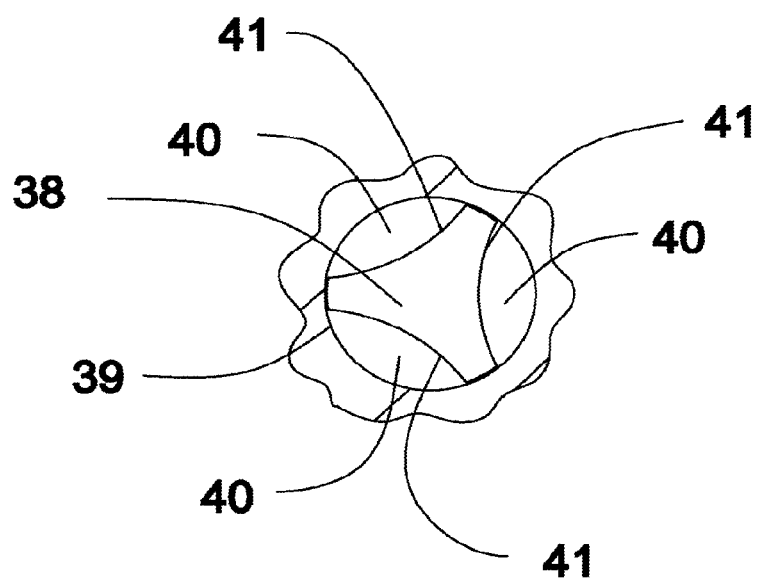
FIG. 26 provides an end view of a valve stem within a fragmentary cross-section of a cartridge and a valve stem guide (or, in a valve-in-body embodiment, a portion of a cross-section of a cavity of a cylinder piston), according to the present invention.

The poppet is coaxial with the valve stem. The valve stem 38 shown in FIG. 26 is triangular in cross-section, and, when placed in the bore 39 of the valve stem guide, results in three distinct flow areas 40. The flats of the triangle may be radiused with a negative bias 41, as shown, to improve flow area and reduce pressure drop.

The dimensions of the triangle are ideally made larger than the circumscribed circle of the valve guide bore so that the points of the triangle are replaced with three distinct guide lands. The stem within the bore provides the primary means of axial guidance of the poppet in the bore.

The flow channels in the poppet are the same in number, and are aligned, with the flow areas around the stem, so as not to induce any tendency to rotate the poppet.

The cross-section of the stem is shown to be a triangle. It is recognized that other cross-sections can be employed, such as a rectangular section, square section, or other polygonal section. The triangle shown is believed to be the preferred cross-sectional geometry of the stem. It provides the largest ratio of flow channel area per unit of stem cross sectional area, when compared to other regular polygons. Also, should there be a lack of perpendicularity of the bore in the piston with respect to the cylinder wall that the stem is designed to strike, the triangular cross-section will accommodate this better than, say, a thin rectangular cross-section.

The poppet is ideally made of a hard material, such as hardened steel. The valve stem guide ideally should be made of a hard material as well so as to resist any wear that may be induced by the stem, particularly if the stem is struck in an non-axial manner. However, there should be a hardness mismatch between the poppet and stem guide, such that the poppet may slightly deform the seat in operation so that the mating surfaces conform to each other to limit leakage. A similar mismatch is desirable between the poppet and the opposing sealing surface on the cartridge.

The operation of the present invention can be summarized as follows, with reference to FIGS. 27-29.

As stated previously, the invention is designed to allow two or more cylinders working together to resynchronize or re-phase their positions at the end of their strokes. FIG. 27 shows two cylinders working together that, due to the various reasons mentioned previously, have gotten "out of phase" with each other. In other words, the rod of the upper cylinder 201 is extended further than the rod of the lower cylinder 200. The relative positions are exaggerated for clarity. In this example, the stem 202 of the phaser of the upper cylinder has just come into contact with the end of the cylinder. The stem 203 of the lower cylinder is still a distance away from its corresponding end.

Figure 27:
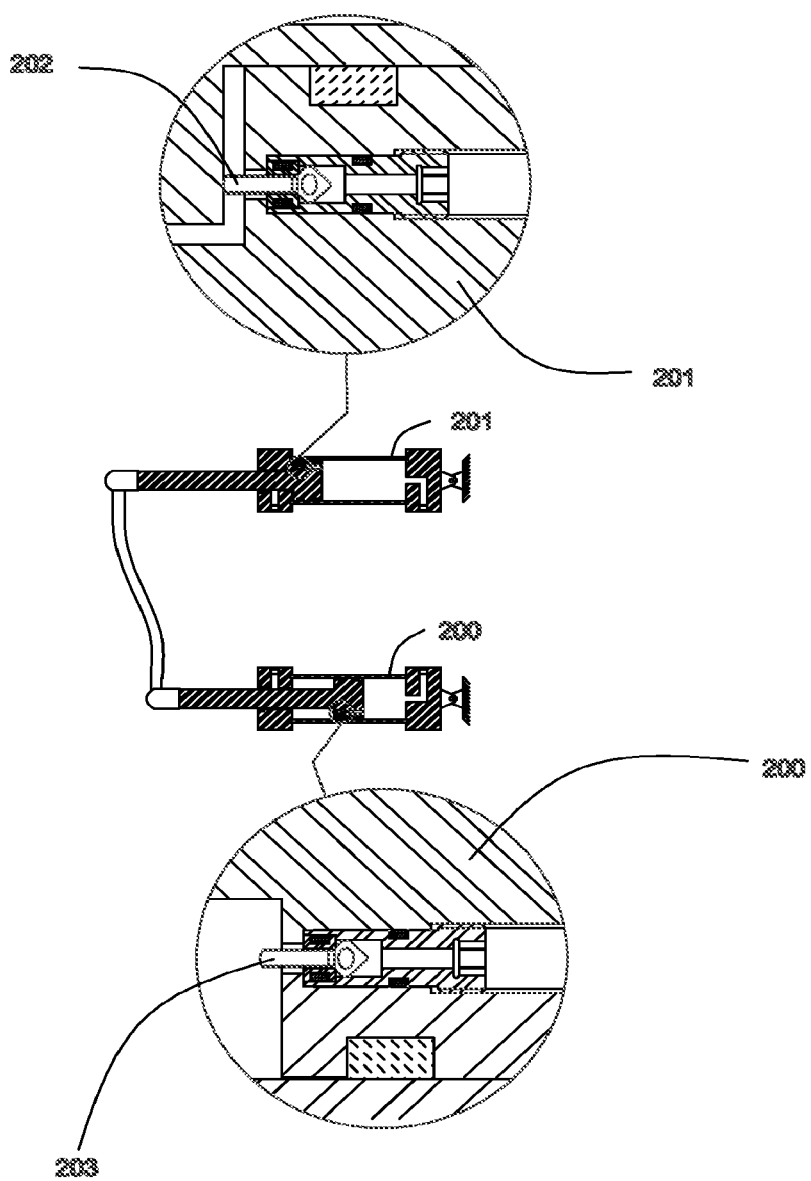
FIG. 27 provides cross-sectional views of two cylinder assemblies operating together, with their rods fixed to the same structure, plus expanded cross-sectional views of portions of each piston showing a valve of the invention in each, the upper cylinder in the figure having almost reached the end of its stroke such that the stem of its phaser valve has just come in contact with the end of the cylinder.
Figure 28:
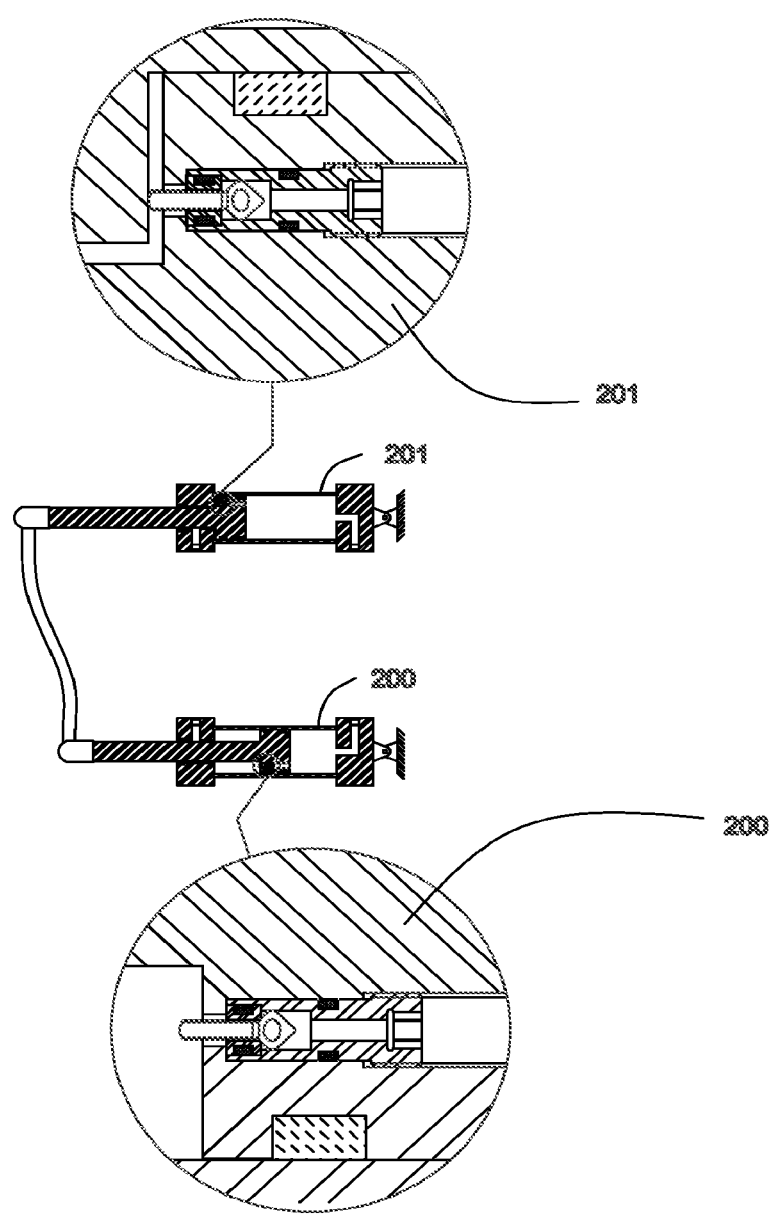
FIG. 28 provides cross-sectional views of two cylinder assemblies operating together, with their rods fixed to the same structure, plus expanded cross-sectional views of portions of each piston showing a valve of the invention in each, the upper cylinder in the figure having almost reached the end of its stroke such that the stem of its phaser valve has come in contact with the end of the cylinder and its poppet has moved away from sealing contact with the stem guide.

In FIG. 28, assuming that the blind ends of both cylinders are being pressurized, and the rod ends are being discharged to a hydraulic reservoir at low pressure, the piston of the upper cylinder 201 has advanced a small distance when compared to FIG. 27. The poppet of the phaser of the upper cylinder has been moved away from sealing contact with its valve stem guide. This will allow the flow of hydraulic fluid from the high pressure region in the blind end, to the lower pressure region in the rod end. This will tend to slow or stall movement of the upper piston. The lower piston will continue to move as before.

Figure 29:
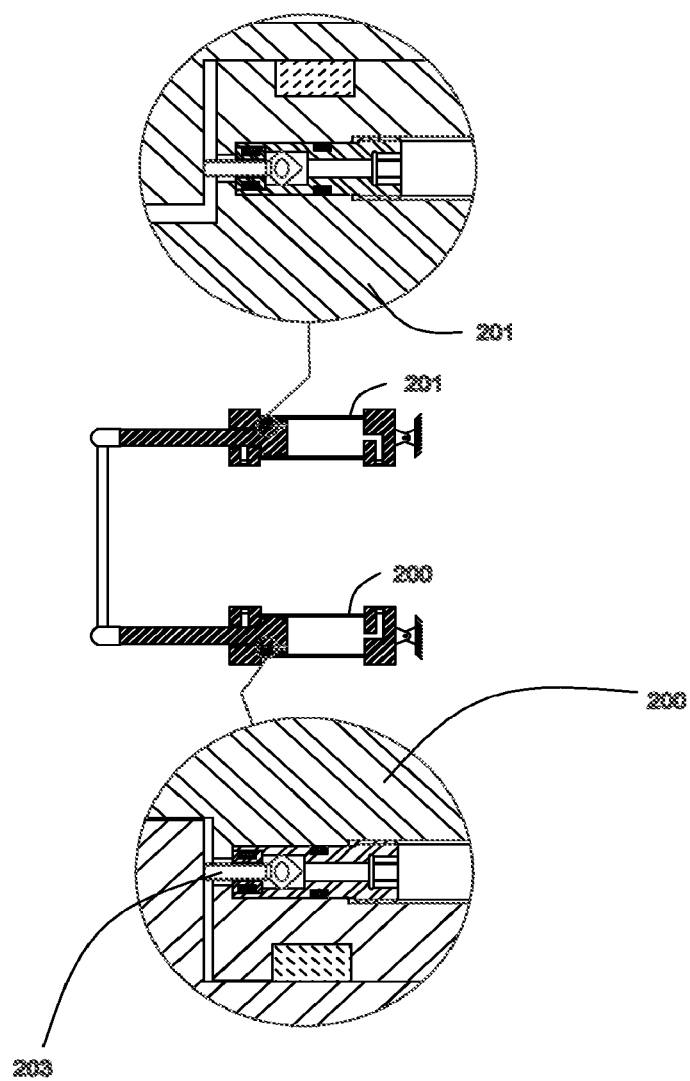
FIG. 29 provides cross-sectional views of two cylinder assemblies operating together, with their rods fixed to the same structure, plus expanded cross-sectional views of portions of each piston showing a valve of the invention in each, the upper cylinder in the figure having reached the end of its stroke, and the lower cylinder having almost reached the end of its stroke such that the stem of its phaser valve has come in contact with the end of the cylinder.

FIG. 29 shows the result of continued application of pressurized hydraulic fluid to the blind ends of both cylinders. The upper cylinder 201 has slowly advanced to full extension. During this time, the lower cylinder 200 has advanced at a faster rate such that the stem 203 of its phaser is now in contact with the end of the cylinder wall. The relative positions of the ends of each rod are much closer.

Note that the basic source of synchronization of the pistons in the cylinders is the fact that pressurized fluid is conveyed, simultaneously, into the blind ends, or the rod ends, of both cylinders. The phaser valves of the present invention serve to smooth the "rough edges" of each stroke. That is, both pistons are driven by the same application of pressure, but the valves of the present invention prevent one piston from "getting ahead" of the other, at or near the end of the stroke, by slowing that piston until the other piston has reached approximately the same position.

Also, the structure of the valves implies that the first valve to reach the cylinder wall is the one which is slowed. Thus, either piston could be slowed, since both pistons are equipped with the same phaser valve of the present invention. The invention thus automatically slows the first piston to reach the cylinder wall.

The invention can be modified in various ways. The exact geometry of the poppet head and poppet stem can be varied, as can the number of concave regions and surfaces. These and other modifications, which will be apparent to those skilled in the art, should be considered within the spirit and scope of the following claims.

What is claimed is:

1. A phaser valve for controlling motion of a piston and cylinder assembly, comprising:
   a housing,
   a poppet having a poppet head and a stem, the poppet head being held within the housing by a pair of seats, and
   a stem guide held by said housing, the stem guide defining a channel for movement of the stem therethrough,
   wherein the poppet head has a forward portion which is generally conical, and a rearward portion which is generally conical, the forward and rearward portions being disposed on either side of a plurality of lands, the lands being separated by a plurality of concave regions,
   wherein the stem includes a plurality of elongated concave surfaces extending along a length of the stem.

2. The phaser valve of claim 1, wherein the elongated concave surfaces formed on the stem are generally aligned with the concave regions formed on the poppet head.

3. The phaser valve of claim 2, wherein there are three concave regions formed on the poppet head and three concave surfaces formed on the stem.

4. The phaser valve of claim 1, wherein there are three concave regions formed on the poppet head and three concave surfaces formed on the stem.

5. The phaser valve of claim 1, wherein there are two stems, disposed on either side of the poppet head.

6. A piston and cylinder assembly having the phaser valve of claim 1.

7. The phaser valve as recited in claim 1, wherein the stem further comprises stem lands, and the stem lands abut or nearly abut an interior surface of the stem guide.

8. The phaser valve as recited in claim 1, wherein an axial length of the stem is longer than an axial length of a largest diameter of the poppet head.

9. A phaser valve, comprising:
   a valve housing, the housing accommodating two opposing valve seats, a poppet comprising a poppet head and a poppet stem, the poppet being disposed for sliding movement within the housing, wherein the valve seats define limiting positions for the poppet, wherein the poppet head includes a distal portion which is generally conical, and a proximal portion which is generally conical, the poppet head having a plurality of lands separated by concave regions located between the distal and proximal portions of the poppet head, and wherein the poppet stem includes a plurality of elongated concave surfaces extending along an entire length of the poppet stem, wherein the concave regions of the poppet head are aligned with the concave surfaces of the poppet stem.

10. The phaser valve of claim 9, wherein there are three concave regions formed on the poppet head and three concave surfaces formed on the stem.

11. The phaser valve of claim 9, wherein there are two stems, disposed on either side of the poppet head.

12. The phaser valve as recited in claim 9, further comprising:

a stem guide held by said valve housing, the stem guide defining a channel for movement of the poppet stem therethrough, wherein the poppet stem further comprises stem lands, and the stem lands abut or nearly abut an interior surface of the stem guide.

13. The phaser valve as recited in claim 9, wherein an axial length of the stem is longer than an axial length of a largest diameter of the poppet head.

14. A cylinder and piston assembly, comprising a piston disposed for reciprocating movement within the cylinder, the piston being connected to a phaser valve, wherein the phaser valve comprises:

a valve housing, the housing accommodating two opposing valve seats, a poppet comprising a poppet head and a poppet stem, the poppet being disposed for sliding movement within the housing, wherein the valve seats define limiting positions for the poppet, wherein the poppet stem is sufficiently long to enable the poppet stem to contact a surface of the cylinder before the piston contacts said surface, wherein the poppet head includes a distal portion which is generally conical, and a proximal portion which is generally conical, the poppet head having a plurality of lands separated by concave regions located between the distal and proximal portions of the poppet head, and wherein the poppet stem includes a plurality of elongated concave surfaces extending along an entire length of the poppet stem, wherein the concave regions of the poppet head are aligned with the elongated concave surfaces of the poppet stem, the assembly further including means, controlled by the phaser valve, for directing fluid alternately into opposite sides of the piston.

15. The assembly of claim 14, wherein there are three concave regions formed on the poppet head and three elongated concave surfaces formed on the stem.

16. The phaser valve of claim 14, wherein there are two stems, disposed on either side of the poppet head.

17. The phaser valve as recited in claim 16, wherein an axial length of the stem is longer than an axial length of a largest diameter of the poppet head.

18. The phaser valve as recited in claim 14, further comprising:

a stem guide held by said valve housing, the stem guide defining a channel for movement of the poppet stem therethrough, wherein the poppet stem further comprises stem lands, and the stem lands abut or nearly abut an interior surface of the stem guide.

19. The assembly as recited in claim 14, wherein an axial length of the poppet stem is longer than an axial length of a largest diameter of the poppet head.

20. A phaser valve, comprising:

a housing, a poppet having a poppet head and a stem, the poppet head being held within the housing by a pair of seats, and a stem guide held by said housing, the stem guide defining a generally cylindrical channel, for movement of the stem therethrough, the stem guide having a length sufficient to enable the stem guide to extend outside the housing for at least one position of the poppet head, wherein the poppet head has a distal end which is generally conical, and a proximal end which is generally conical, the poppet head also having a plurality of lands separated by a plurality of concave regions located between the distal and proximal ends of the poppet head, wherein the stem includes a plurality of elongated concave surfaces extending along a length of the stem, the elongated concave surfaces formed on the stem being generally aligned with the concave regions formed on the poppet head, wherein there are three concave regions on the poppet head and three concave surfaces on the stem, and wherein the stem has a generally triangular cross-section.

21. The phaser valve of claim 20, wherein there are two stems, disposed on either side of the poppet head.

22. The phaser valve as recited in claim 20, wherein the stem further comprises stem lands, and the stem lands abut or nearly abut an interior surface of the stem guide.

* * * * *